(12) United States Patent
Mahr et al.

(10) Patent No.: US 6,201,058 B1
(45) Date of Patent: Mar. 13, 2001

(54) AMINOSILOXANE-CONTAINING COMPOSITIONS

(75) Inventors: Günter Mahr; Franz X. Wimmer; Jörn Winterfeld, all of Burghausen (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/179,068

(22) Filed: Oct. 26, 1998

(30) Foreign Application Priority Data

Nov. 7, 1997 (DE) .............................................. 197 49 380

(51) Int. Cl.⁷ .............................. C08J 3/05; C08L 83/08
(52) U.S. Cl. .............................. 524/506; 528/31; 528/32; 528/37; 528/42; 528/33; 528/34; 528/38; 528/15; 556/470; 556/478; 427/154; 510/400; 106/2
(58) Field of Search .................................. 528/31, 32, 37, 528/42, 33, 34, 38, 15; 556/470, 478; 427/154; 510/400; 106/2; 524/506

(56) References Cited

U.S. PATENT DOCUMENTS

| 3,681,122 | 8/1972 | Domicone et al. . |
| 4,124,523 | 11/1978 | Johnson . |
| 4,699,988 | 10/1987 | Traver et al. . |
| 4,757,106 | 7/1988 | Mayer et al. . |
| 5,077,421 | 12/1991 | Selvig . |
| 5,261,951 | 11/1993 | Sejpka et al. . |
| 5,385,961 | * 1/1995 | Avakian . |
| 5,486,634 | 1/1996 | Hahn et al. . |

FOREIGN PATENT DOCUMENTS

| 29 52 756 | 7/1981 | (DE) . |
| 33 21 289 A1 | 12/1984 | (DE) . |
| 36 13 384 | 1/1988 | (DE) . |
| 33 27 926 | 6/1994 | (DE) . |
| 1 548 789 A1 | 6/1993 | (EP) . |
| 0 659 803 A2 | 6/1995 | (EP) . |
| 1172479 | 12/1969 | (GB) . |

OTHER PUBLICATIONS

Derwent Abstract (#84–31512/51) corresponding to DE 33 21 289.
Derwent Abstract (#81–49981D/28) corresponding to DE 29 52 756.
Derwent Abstract (#85–050916/09) corresponding to DE 33 27 926.

* cited by examiner

Primary Examiner—Robert Dawson
Assistant Examiner—Kuo-Liang Peng
(74) Attorney, Agent, or Firm—Brooks & Kushman P.C.

(57) ABSTRACT

The invention relates to organopolysiloxanes that have amino groups and are solid at room temperature which can reversibly change their states of aggregation on the basis of temperature changes. Preparations containing these organopolysiloxanes are useful in the cleaning, care, and hydrophobicization of surfaces.

24 Claims, No Drawings

AMINOSILOXANE-CONTAINING COMPOSITIONS

TECHNOLOGICAL FIELD

The invention relates to organopolysiloxanes that have amino groups and are solid at room temperature, to compositions which comprise these compounds, to processes for their preparation and to a process for the treatment of surfaces therewith.

DESCRIPTION OF THE RELATED ART

The use of organopolysiloxanes in cleaning compositions, such as, for example, solutions for washing windows, car polishes, glass ceramic care agents, metal and textile cleaners, is known. The publications GB Patent 1,172,479, U.S. Pat. No. 3,681,122 and U.S. Pat. No. 4,124,523 essentially describe cleaners comprising an organopolysiloxane, an alkali metal salt from main groups 1 to 5, a scouring agent and water, and where necessary, a thickener and a nonionic surfactant. Although these formulations are in principle suitable for cleaning surfaces, the protecting, maintenance, and hydrophobicizing properties are completely inadequate. EP 0 548 789 A1 describes care agents for hard surfaces which are substantially free of organic solvent and are prepared using organopolysiloxanes that are solid at room temperature. The care agents are notable for a high resistance to weathering and washing, but exhibit inadequate color saturation and gloss depth. U.S. Pat. No. 4,699,988 describes wax-like silanes and siloxanes having amine functions. Long-chain alkyl radicals are bonded to the siloxane via a Si—O—C bond which, as the person skilled in the art knows, is undesirably unstable to hydrolysis, particularly when the pH deviates from seven.

DE-A 33 21 289 describes a water-in-oil emulsion for cleaning glass ceramic surfaces which comprises a liquid aminofunctional organopolysiloxane, a cyclic dimethylpolysiloxane, a polysiloxane-polyoxyalkylene block copolymer, a scouring powder, a surfactant and water. Although this formulation likewise has cleaning power, the protective effect of the liquid aminofunctional organopolysiloxane present as protective film former, in particular against burnt-on food remains which have a high content of sugar, is unsatisfactory. DE Patent 29 52 756 describes compositions which include a metal oxide- and/or amino group-containing polysiloxane, a scouring and cleaning agent and additional surfactants. Although the care agents in question have a cleaning and conditioning effect, they have a short shelf life as a result of a continual increase in viscosity, exhibit poor polishability and an insufficient protective effect against burnt-on foods which have a high sugar content. DE-A 33 27 926 presents an emulsion formulation which comprises a liquid aminofunctional polydimethylsiloxane, emulsifiers, acidic constituents, a solvent, a scouring agent, protective film-improvers and water. Although the care agents in question have a cleaning and conditioning effect, they exhibit the same disadvantages as described for DE Patent 29 52 756.

SUMMARY OF THE INVENTION

The object was thus to provide compositions based on organopolysiloxanes which overcome the disadvantages of the prior art and, in particular, exhibit a very good, long-term protective and care effect, and a very good, long-term hydrophobicization, coupled with excellent color saturation and gloss depth. The object has been achieved by the invention described below, in which organopolysiloxanes bearing amino groups, which are solid at room temperature, but which reversibly change their states of aggregation, are used to treat surfaces.

DESCRIPTION OF THE PREFERRED EMBODIMENTS

The present invention thus provides organopolysiloxanes that have amino groups and are solid at room temperature which can reversibly change their states of aggregation on the basis of temperature changes. For the purposes of the invention, the reversible change in the state of aggregation means that the solid state of aggregation reversibly changes into the liquid state of aggregation and vice versa. Room temperature should be taken to mean a temperature of 20° C. in the text below.

The organopolysiloxanes that have amino groups and are solid at room temperature are preferably those containing siloxane units of the general formula I

$$R^1{}_a R^2{}_b R^3{}_c SiO_{(4-a-b-c)/2} \qquad (I)$$

in which

R$^1$ can be identical or different and preferably signifies monovalent unsubstituted or fluorine-, chlorine- or bromine-substituted hydrocarbon radicals having, preferably, from 1 to 12 carbon atoms, alkoxy radicals having, preferably, from 1 to 12 carbon atoms, hydroxy radicals or halogen radicals, R$^2$ can be identical or different and preferably signifies monovalent unsubstituted hydrocarbon radicals having, preferably, from 1 to 40 carbon atoms, R$^3$ can be identical or different and preferably signifies hydrocarbon radicals containing amino groups, a is 0, 1, 2 or 3, b is 0, 1 or 2, c is 0, 1 or 2, with the proviso that the sum a+b+c is less than or equal to 3, and in the whole molecule, there is at least one unit which has a hydrocarbon radical containing amino groups.

Preference is given to linear or cyclic organopolysiloxanes that have amino groups and are solid at room temperature or any mixtures thereof which have the formulae II

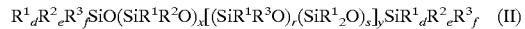

$$R^1{}_d R^2{}_e R^3{}_f SiO(SiR^1 R^2 O)_x[(SiR^1 R^3 O)_r (SiR^1{}_2 O)_s]_y SiR^1{}_d R^2{}_e R^3{}_f \qquad (II)$$

and III

$$[(SiR^1 R^4 O)]_t \qquad (III)$$

in which

R$^1$, R$^2$ and R$^3$ are as defined above,

R$^4$ can be identical or different and signifies R$^1$, R$^2$ or R$^3$, d is 1, 2 or 3, e is 0, 1 or 2, f is 0, 1 or 2, r is an integer from 0 to 150, preferably from 0 to 100, particularly preferably from 0 to 50, s is an integer from 0 to 200, preferably from 0 to 150, particularly preferably from 0 to 100, x is an integer from 0 to 300, preferably from 0 to 200, particularly preferably from 0 to 100, y is an integer from 0 to 200, preferably from 0 to 150, particularly preferably from 0 to 100, the sum x+y is from 0 to 500, preferably 350 and particularly preferably 200, it being possible for the units $(SiR^1R^3O)_r$ and $(SiR^1{}_2O)_s$ to be in any order, z is an integer from, preferably, 3 to 30, more preferably from 3 to 20, particularly preferably from 3 to 12, preferably with the proviso that at least one radical $R^2$ in formula II signifies a hydrocarbon radical having at least 14 carbon atoms, and at least one radical $R^3$ is present in formula II, and preferably with the proviso that at least the radical $R^4$ in formula III has at the same time the meaning of $R^2$ once and the meaning of $R^3$ once.

The radical $R^1$ is preferably a $C_1$- to $C_{12}$-hydrocarbon radical, $C_1$- to $C_{12}$-alkoxy radical, a halogen radical or a hydroxy radical.

Examples of radicals $R^1$ are preferably alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, and dodecyl radicals such as the n-dodecyl radical; alkenyl radicals such as vinyl and allyl radicals; cycloalkyl radicals such as cyclopentyl, cyclohexyl, cycloheptyl radicals and methylcyclohexyl radicals; aryl radicals such as the phenyl and the naphthyl radicals; alkaryl radicals such as the o-, m-, p-tolyl radicals, xylyl radicals and ethylphenyl radicals; aralkyl radicals such as the benzyl radical, the α- and the β-phenylethyl radicals; and halogen radicals such as the chlorine, fluorine, bromine and iodine radicals.

The alkoxy radicals $R^1$ are alkyl radicals described above bonded via an oxygen atom. The examples of alkyl radicals also fully apply to the alkoxy radicals.

$R^1$ is particularly preferably the methyl radical, the methoxy radical, the chlorine radical and the hydroxy radical.

The radical $R^2$ is preferably a hydrocarbon radical having from 14 to 40 carbon atoms, preferably a hydrocarbon radical having from 14 to 32 carbon atoms, the n-octadecyl radical being preferred.

Examples of radicals $R^2$ are alkyl radicals such as —(CH$_2$)$_{13}$CH$_3$, —(CH$_2$)$_{14}$CH$_3$, —(CH$_2$)$_{15}$CH$_3$, —(CH$_2$)$_{16}$CH$_3$, —(CH$_2$)$_{17}$CH$_3$, —(CH$_2$)$_{18}$CH$_3$, —(CH$_2$)$_{19}$CH$_3$, —(CH$_2$)$_{20}$CH$_3$, —(CH$_2$)$_{21}$CH$_3$, —(CH$_2$)$_{22}$CH$_3$, —(CH$_2$)$_{23}$CH$_3$, —(CH$_2$)$_{24}$CH$_3$, —(CH$_2$)$_{25}$CH$_3$, —(CH$_2$)$_{26}$CH$_3$, —(CH$_2$)$_{27}$CH$_3$, —(CH$_2$)$_{28}$CH$_3$, —(CH$_2$)$_{29}$CH$_3$, —(CH$_2$)$_{30}$CH$_3$, —(CH$_2$)$_{31}$CH$_3$, —(CH$_2$)$_{32}$CH$_3$ and their isomers.

The radical $R^3$ is preferably a radical of the formula IV

  (IV)

in which $R^5$ is preferably a divalent $C_1$- to $C_{18}$-hydrocarbon radical, $R^6$ is preferably a hydrogen atom or an unsubstituted or fluorine-, chlorine- or bromine-substituted $C_1$- to $C_{10}$-alkyl radical, $R^7$ is preferably a divalent $C_1$- to $C_{18}$-hydrocarbon radical, $R^8$ is preferably a hydrogen atom or an unsubstituted or fluorine-, chlorine- or bromine-substituted $C_1$- to $C_{10}$-alkyl radical, $R^9$ is preferably a hydrogen atom or an unsubstituted or fluorine-, chlorine- or bromine-substituted $C_1$- to $C_{10}$-alkyl radical and t is preferably an integer from 0 to 6.

Examples of divalent $C_1$- to $C_{18}$-hydrocarbon radicals $R^5$ and $R^7$ are the methylene, ethylene, n-propylene, isopropylene, n-butylene, isobutylene, tertbutylene, n-pentylene, isopentylene, neopentylene, and tert-pentylene radicals; hexylene radicals such as the n-hexylene radical; heptylene radicals such as the n-heptylene radical; octylene radicals such as the n-octylene radical and isooctylene radicals such as the 2,2,4-trimethylpentylene radical; nonylene radicals such as the n-nonylene radical; decylene radicals such as the n-decylene radical; dodecylene radicals such as the n-dodecylene radical; and octadecylene radicals such as the n-octadecylene radical.

Examples of $C_1$- to $C_{10}$-alkyl radicals $R^6$, $R^8$ and $R^9$ are the hydrocarbon radicals up to $C_{10}$ given under $R^1$.

$R^3$ is particularly preferably a radical of the general formula V,

  (V)

in which $R^{10}$ is preferably a divalent $C_1$- to $C_{12}$-hydrocarbon radical, $R^{11}$ is preferably a hydrogen atom or a $C_1$- to $C_{10}$-alkyl radical, $R^{12}$ is preferably a divalent $C_1$- to $C_{12}$-hydrocarbon radical, $R^{13}$ is preferably a hydrogen atom or a $C_1$- to $C_{10}$-alkyl radical, $R^{14}$ is preferably a hydrogen atom or a $C_1$- to $C_{10}$-alkyl radical, and u is an integer from 0 to 3.

Examples of divalent $C_1$- to $C_{12}$-hydrocarbon radicals $R^{10}$ and $R^{12}$ are the hydrocarbon radicals up to $C_{12}$ given under $R^5$ and $R^7$.

Examples of $C_1$- to $C_{10}$-alkyl radicals $R^{11}$, $R^{13}$ and $R^{14}$ are the hydrocarbon radicals up to $C_{10}$ given under $R^1$. Preferred examples of the radicals $R^3$ are —CH$_2$—CH$_2$—CH$_2$—NH$_2$, —CH$_2$—CH$_2$—CH$_2$—NH(CH$_3$), —CH$_2$—CH$_2$—CH$_2$—N(CH$_3$)$_2$, —CH$_2$—CH$_2$—CH$_2$—NH—CH$_2$—CH$_2$—NH$_2$, —CH$_2$—CH$_2$—CH$_2$—NH—CH$_2$—CH$_2$—NH(CH$_3$), —CH$_2$—CH$_2$—CH$_2$—NH—CH$_2$—CH$_2$—N(CH$_3$)$_2$, —CH$_2$—CH$_2$—CH$_2$—NH—CH$_2$—CH$_2$—NH(CH$_2$CH$_3$), —CH$_2$—CH$_2$—CH$_2$—NH—CH$_2$—CH$_2$—N(CH$_2$CH$_3$)$_2$ and —CH$_2$—CH$_2$—CH$_2$—NH(cyclo-C$_6$H$_{11}$).

Although it is not stated in the above formula, up to 10 mol percent of the diorganosiloxane units can be replaced by other siloxane units which in most cases are, however, in the form of impurities which can be avoided only with varying degrees of difficulty, such as $R^1{}_3SiO_{1/2}$-, $R^1SiO_{3/2}$-, and $SiO_{4/2}$- units, in which $R^1$ is as defined above.

The novel organopolysiloxanes of the formulae II and III that have amino groups and are solid at room temperature preferably have a wax-like consistency and a melting point between 25 and 100° C.

The invention further provides a process for the preparation of the organopolysiloxanes that have amino groups and are solid at room temperature.

Preferably, the novel organopolysiloxanes that have amino groups and are solid at room temperature are prepared by reacting silanes of the general formula VI

  (VI)

or oligomeric hydrolysates of the silanes of the formula VI prepared by methods known in silicon chemistry, or any mixtures thereof, together with organosilicon compounds chosen from silanes of the general formula VII $$R^1_iR^3_kSi \quad (VII)$$

or siloxanes constructed from siloxane units of the general formula VIII $$R^1_lR^3_mSiO_{(4-l-m)/2} \quad (VIII)$$

or any mixtures thereof,
in which
R$^1$, R$^2$ and R$^3$ are as defined above,
g is 1, 2, 3 or 4,
h is 0, 1 or 2,
i is 1, 2, 3 or 4,
k is 0, 1 or 2,
l is 0, 1, 2 or 3, and
m is 0, 1 or 2 and wherein the sum of g+h and the sum of i+k are both equal to 4; the silanes of formulae VI and VII and the siloxane of formula VIII each contain at least one R$^1$ which is halogen, alkoxy or hydroxy; and wherein at least one R$^2$ and at least one R$^3$ are present.

The novel organopolysiloxanes of the general formula I that have amino groups and are solid at room temperature are preferably prepared by reacting silanes of the general formula VI with silanes of the general formula VII or hydrolysates prepared from silanes of the general formula VII by methods known in silicon chemistry, or siloxanes containing units of the general formula VIII, or any mixtures thereof.

The siloxanes constructed from siloxane units of the general formula VIII can be linear, branched or cyclic.

The novel organopolysiloxanes of the general formula I that have amino groups and are solid at room temperature are particularly preferably prepared by reacting silanes of the general formula VI, which have been converted to an oligomeric hydrolysate by methods known in silicon chemistry, with silanes of the general formula VII or hydrolysates prepared from silanes of the general formula VII by methods known in silicon chemistry, or siloxanes containing units of the general formula VIII, or any mixtures thereof.

The siloxanes constructed from siloxane units of the general formula VIII can be linear, branched or cyclic.

The novel process can be carried out in the presence or absence of solvents. If solvents are used, solvents having a boiling point or a boiling range of up to 160° C. at 0.1 MPa are preferred. Examples of such solvents are water; alcohols such as methanol, ethanol, n-propanol, isopropanol, n-amyl alcohol, and i-amyl alcohol; ethers such as dioxane, tetrahydrofuran, diethyl ether, diisopropyl ether, and diethylene glycol dimethyl ether; chlorinated hydrocarbons such as dichloromethane, trichloromethane, tetrachloromethane, 1,2-dichloroethane, and trichloroethylene; hydrocarbons such as pentane, n-hexane, hexane isomer mixtures, heptane, octane, petroleum spirit, petroleum ether, benzene, toluene, and xylenes; ketones such as acetone, methyl ethyl ketone, diisopropyl ketone, and ethyl isobutyl ketone (MIBK); esters such as ethyl acetate, butyl acetate, propyl propionate, ethyl butyrate, and ethyl isobutyrate; carbon disulfide; and nitrobenzene, or mixtures of these solvents.

The term solvent does not mean that all of the reaction components must dissolve in it. The reaction can also be carried out in a suspension or emulsion of one or more reactants. The reaction can also be carried out in a solvent mixture having a miscibility gap, and at least one reactant being soluble in each case in each of the mixed phases.

In the above process, it is possible to use catalysts which promote the condensation reaction and also the equilibrium reaction and which are known per se. Examples of catalysts which promote the condensation and equilibrium reaction are sulfuric acid, phosphoric acid, trifluoromethanesulfonic acid, iron(II) chloride, aluminum chloride, boron trifluoride, zinc chloride, kaolin, acidic zeolites, sulfonated carbon, alkali metal hydroxides such as lithium hydroxide, sodium hydroxide, potassium hydroxide and cesium hydroxide, alkali metal alkoxides, quaternary ammonium hydroxides such as tetramethylammonium hydroxide, benzyltrimethylammonium hydroxide, benzyltriethylammonium hydroxide, benzyltrimethylammonium butoxide, β-hydroxyethyltrimethyl-ammonium 2-ethylhexoate, quaternary phosphonium hydroxides such as tetra-n-butylphosphonium hydroxide and tri-n-butyl-3-[tris(trimethylsiloxy)silyl]-n-propylphosphonium hydroxide, alkali metal siloxanolates and ammonium organosiloxanolates such as benzyltrimethylammonium ethylsiloxanolate, and phosphorus-nitrogen compounds.

Particular preference is given to acid catalysts such as sulfuric acid, trifluoromethanesulfonic acid and hydrochloric acid, or basic catalysts such as potassium hydroxide, tetramethylammonium hydroxide and benzyltrimethylammonium hydroxide.

In the above process, preferably from 2 ppm to 1%, in particular from 10 to 1000 ppm, of catalyst, in each case based on the weight of the organosilicon compounds employed, are used.

The process is preferably carried out at temperatures of from 60 to 200° C., particularly preferably from 80 to 170° C. and in particular from 80 to 140° C. and a pressure of the ambient atmosphere, i.e. between 900 and 1100 hPa.

The invention further provides a second process for the preparation of the organopolysiloxanes that have amino groups and are solid at room temperature.

The novel organopolysiloxanes that have amino groups and are solid at room temperture can also be prepared by addition of SiH group-containing organopolysiloxanes, such as, preferably, $$R^1_dR^2_eH_fSiO(SiR^1R^2O)_x[(SiHR^1O)_r(SiR^1_2O)_s]_ySiR^1_dR^2_eH_f$$

or silanes with aminofunctional alkenes of the general formula IX $$H_2C=CR^5-R^5-[(NR^6)-R^7]_tNR^8R^9 \quad (IX)$$

in the presence of a catalyst which promotes the hydrosilylation reaction and is known per se, such as, for example, preferably a platinum or rhodium compound, in which
R$^1$, R$^2$, R$^5$, R$^6$, R$^7$, R$^8$, R$^9$, d, e, f, x, r, s, y and t are as defined above, and R$^{15}$ is a hydrogen atom or a radical R$^1$.

The catalysts used are preferably platinum metals and/or their compounds, preferably platinum and/or its compounds. It is possible to use here all catalysts which have hitherto also been used for the addition of hydrogen atoms bonded directly to Si atoms to aliphatically unsaturated compounds. Examples of such catalysts are metallic and finely divided platinum, which may be on supports such as silicon dioxide, aluminum oxide or activated carbon, compounds or complexes of platinum, such as platinum halides, e.g. PtCl$_4$, H$_2$PtCl$_6$.6H$_2$O, Na$_2$PtCl$_4$.4H$_2$O, platinum-olefin complexes, platinum-alcohol complexes, platinum-alkoxide complexes, platinum-ether complexes, platinum-aldehyde complexes, platinum-ketone complexes, including reaction products of H$_2$PtCl$_6$.6H$_2$O and cyclohexanone, platinum-vinylsiloxane complexes, in particular platinum-divinyltetramethyldisiloxane complexes with or without a content of detectable inorganically bonded halogen, bis (gamma-picoline)platinum dichloride, trimethylenedipyridineplatinum dichloride, dicyclopentadieneplatinum dichloride, dimethylsulfoxidethyleneplatinum(II) dichloride and also reaction products of platinum tetrachloride with olefin and primary amine, secondary amine, or primary and secondary amine, such as the reaction product of platinum tetrachloride dissolved in 1-octene with sec-butylamine, or ammonium-platinum complexes as in EP-B 110 370.

The platinum catalyst is preferably used in amounts of from 0.5 to 500 ppm by weight (parts by weight per million parts by weight), in particular from 2 to 400 ppm by weight, in each case calculated as elemental platinum and based on the total weight of the diorganopolysiloxanes present in the compositions.

The novel organopolysiloxanes that have amino groups and are solid at room temperature can also be prepared by reacting organopolysiloxanes or organosilanes having chlorine- or bromine-substituted alkyl groups with amines of the general formula X

$$H[(NR^6)-R^7]_t NR^8 R^9 \qquad (X)$$

in which $R^6$, $R^7$, $R^8$, $R^9$ and t are as defined above.

The invention further provides compositions which comprise organopolysiloxanes that have amino groups and are solid at room temperature. The novel compositions are preferably prepared using organopolysiloxanes made of units of the formula I that are solid at room temperature and, particularly preferably, from organopolysiloxanes of the formulae II or III that are solid at room temperature, or mixtures thereof.

For the preparation of the novel compositions, organopolysiloxane containing amino groups and solid at room temperature is used in amounts of, preferably, from 0.01 to 20.0 percent by weight, particularly preferably from 0.05 to 10.0 percent by weight, in each case based on the total weight of the care agents according to the invention.

For the preparation of the novel compositions, the organopolysiloxanes that have amino groups and are solid at room temperature are preferably used in the form of an aqueous emulsion. It is, however, also possible to use the solvents defined above for their preparation.

If, for the preparation of the novel compositions, organopolysiloxane comprising units of the formula I that is solid at room temperature and has amino groups is used, the emulsion is preferably prepared by emulsifying the organopolysiloxane comprising units of the formula I that has amino groups and is solid at room temperature with an emulsifier in water.

Emulsification of the organopolysiloxane that contains amino groups and is solid at room temperature can be carried out in customary mixing equipment suitable for the preparation of emulsions, such as, for example, an Ultra-Turrax®, T 50 from IKA.

In the preparation of the aqueous emulsions, used according to the invention, of organopolysiloxanes that contain amino groups and are solid at room temperature, the emulsifiers which can be used are all hitherto known ionic and nonionic emulsifiers either individually or else in mixtures of different emulsifiers, which have also hitherto been used to prepare resistant aqueous emulsions of organopolysiloxanes. It is also possible to use those emulsifiers described in DE 36 13 384 C and in the corresponding US application with the serial number USSN 19988. Preference is given to using nonionic and cationic emulsifiers.

Particularly suitable anionic emulsifiers are:
1. Alkylsulfates, in particular those having a chain length of from 8 to 18 carbon atoms, alkyl and alkaryl ether sulfates having from 8 to 18 carbon atoms in the hydrophobic radical and from 1 to 40 ethylene oxide (EO) or propylene oxide (PO) units.
2. Sulfonates, particularly alkylsulfonates having from 8 to 18 carbon atoms, alkylarylsulfonates having from 8 to 18 carbon atoms, taurides, esters and half-esters of sulfosuccinic acid with monohydric alcohols or alkylphenols having from 4 to 15 carbon atoms, these alcohols or alkylphenols also optionally ethoxylated with from 1 to 40 EO units.
3. Alkali metal and ammonium salts of carboxylic acids having from 8 to 20 carbon atoms in the alkyl, aryl, alkaryl or aralkyl radical.
4. Phosphoric acid partial esters and their alkali metal and ammonium salts, particularly alkyl and alkaryl phosphates having from 8 to 20 carbon atoms in the organic radical, alkyl ether and alkaryl ether phosphates having from 8 to 20 carbon atoms in the alkyl or alkaryl radical respectively and from 1 to 40 EO units.

Particularly suitable nonionic emulsifiers are:
5. Polyvinyl alcohol which still has from 5 to 50%, preferably from 8 to 20%, of vinyl acetate units, having a degree of polymerization of from 500 to 3000.
6. Alkyl polyglycol ethers, preferably those having from 8 to 40 EO units and alkyl radicals having from 8 to 20 carbon atoms.
7. Alkylaryl polyglycol ethers, preferably those having from 8 to 40 EO units and from 8 to 20 carbon atoms in the alkyl and aryl radicals.
8. Ethylene oxide-propylene oxide (EO/PO) block copolymers, preferably those having from 8 to 40 EO and PO units.
9. Addition products of alkylamines whose alkyl radicals have from 8 to 22 carbon atoms with ethylene oxide or propylene oxide.
10. Fatty acids having from 6 to 24 carbon atoms.
11. Alkyl polyglycosides of the general formula $R^*$—O—$Z_o$, in which $R^*$ is a linear or branched, saturated or unsaturated alkyl radical having on average 8–24 carbon atoms, and $Z_o$ is an oligoglycoside radical having on average o=1–10 hexose or pentose units or mixtures thereof.
12. Natural substances and their derivatives, such as lecithin, lanolin, saponins, cellulose; cellulose alkyl ethers and carboxyalkylcelluloses, the alkyl groups of which in each case have up to 4 carbon atoms.
13. Linear organo(poly)siloxanes containing polar groups, in particular those containing alkoxy groups having up to 24 carbon atoms and/or up to 40 EO and/or PO groups.

Particularly suitable cationic emulsifiers are:
14. Salts of primary, secondary and tertiary fatty amines having from 8 to 24 carbon atoms with acetic acid, sulfuric acid, hydrochloric acid and phosphoric acids.
15. Quaternary alkyl and alkylbenzene ammonium salts, in particular those whose alkyl group has from 6 to 24 carbon atoms, in particular halides, sulfates, phosphates and acetates.
16. Alkylpyridinium, alkylimidazolinium and alkyloxazolinium salts, in particular those whose alkyl chain has up to 18 carbon atoms, especially halides, sulfates, phosphates and acetates.

Particularly suitable ampholytic emulsifiers are:

17. Long-chain substituted amino acids, such as N-alkyl-di(aminoethyl)glycine or N-alkyl-2-aminopropionic acid salts.
18. Betaines such as N-(3-acylamidopropyl)—N,N-dimethylammonium salts having a $C_8$–$C_{18}$-acyl radical and alkylimidazolium betaines.

Particular preference is given in this connection to using fatty alcohol polyglycol ethers, nonylphenol polyglycol ethers, tri-n-butylphenol polyglycol ethers and quaternary ammonium salts of saturated and unsaturated fatty acids.

The aqueous emulsions, used according to the invention, of organopolysiloxanes that contain amino groups and are solid at room temperature comprise emulsifier in amounts of preferably from 2 to 20% by weight, particularly preferably from 3 to 10% by weight, in each case based on the total weight of organopolysiloxane that is solid at room temperature used.

The aqueous emulsions, used according to the invention, of organopolysiloxanes that contain amino groups and are solid at room temperature have a solids content of preferably from 10 to 60% by weight, in particular from 15 to 50% by weight, in each case based on the total weight of the emulsion.

The temperature required for melting depends on the organopolysiloxane used and is preferably between 20 and 100° C., particularly preferably between 25 and 80° C.

The melt is emulsified by processes customary in silicon chemistry.

The novel compositions which comprise organopolysiloxanes that have amino groups and are solid at room temperature can also be dissolved in organic solvents, which may also, where appropriate, be used with addition of suitable additives, examples of which will be given below, as care agents. Organic solvents are preferably petroleum benzines, particularly preferably petroleum benzine free from aromatic compounds. Solutions are preferably prepared with a content of from 0.01 to 20% by weight, more preferably from 0.05 to 10% by weight, and particularly preferably from 0.05 to 5% by weight, of solid organopolysiloxane containing amino groups.

Depending on the intended use, the novel composition can contain additives, such as, for example, silicon-free waxes, thickeners, abrasive media, preservatives and additives, and also, where appropriate, further silicones or their emulsions.

Examples of silicon-free waxes are natural waxes of a vegetable origin, such as carnauba wax and candelilla wax, montanic acid and montanic ester waxes, partially oxidized synthetic paraffins, polyethylene waxes, polyvinyl ether waxes and metal soap-containing waxes, preference being given to carnauba wax, paraffin waxes and polyethylene waxes, and particular preference to paraffin waxes.

If, for the preparation of the novel composition, waxes are used, they are preferably used in amounts of from 0.01 to 10.0 percent by weight, particularly preferably from 0.01 to 5.0 percent by weight, in each case based on the total weight of the composition.

Examples of thickeners are homopolysaccharides, heteropolysaccharides, polyacrylates, carboxy- and hydroxymethylcellulose, preference being given to polysaccharides and polyacrylates, and particular preference to polyacrylates.

If, for the preparation of the novel composition, thickeners are used, they are preferably used in amounts of from 0.05 to 5 percent by weight, particularly preferably from 0.1 to 3 percent by weight, in each case based on the total weight of the composition.

Examples of abrasive media are polishing alumina, siliceous chalk, pyrogenic silica and natural kieselguhrs, such as, for example, Sillitin N 85 from Hoffmann Mineral, particular preference being given to siliceous chalk and polishing alumina.

If, for the preparation of the novel composition, abrasive media are used, they are preferably used in amounts of from 1 to 20 percent by weight, particularly preferably from 1 to 10 percent by weight, in each case based on the total weight of the composition.

Examples of preservatives are formaldehyde, parabens, benzyl alcohol, salicylic acid and its salts, benzoic acid and its salts and isothiazolinones, preference being given to formaldehyde and isothiazolinones, and particular preference to formaldehyde.

If, for the preparation of the novel composition, preservatives are used, they are preferably used in amounts of from 0.01 to 0.30 percent by weight, particularly preferably from 0.05 to 0.10 percent by weight, in each case based on the total weight of the composition.

Examples of additives are fragrances and dyes.

If, for the preparation of the novel composition, additives are used, they are preferably used in amounts of from 0.01 to 1 percent by weight, particularly preferably from 0.05 to 1 percent by weight, in each case based on the total weight of the composition.

From each of the groups of substances given above as a possible component for the aqueous or solvent-containing compositions according to the invention, it is possible in each case to use as a component, one substance from this group or else a mixture of at least two different substances therefrom.

The novel compositions preferably comprise water in amounts of from 70 to 99.9 percent by weight, particularly preferably from 80 to 99.5 percent by weight, in each case based on the total weight of the compositions, the water preferably being demineralized.

The individual components of the compositions according to the invention can be mixed together in any desired manner. Thus, for example, the additives can be mixed into the organopolysiloxane solid at room temperature prior to the emulsification step. The additives can, however, also be mixed into the prepared emulsions of organopolysiloxanes solid at room temperature and optionally of organopolysiloxanes liquid at room temperature, which is preferable.

The emulsification or the mixing of the components which can be used to prepare the novel compositions is preferably carried out at a temperature of from 20 to 70° C. and a pressure of the ambient atmosphere, i.e. between 900 and 1100 hPa. It is, however, also possible to use higher or lower temperatures and higher or lower pressures. The emulsification step can be carried out in customary mixing equipment suitable for preparing emulsions, such as high-speed stator-rotor stirring devices from Prof. P Willems, as are known under the registered trademark Ultra-Turrax®.

At room temperature, the novel compositions have a consistency ranging from highly liquid to creamy, pasty, or wax-like. The novel compositions have a good emulsion stability of at least two years during appropriate storage at room temperature.

The present invention further provides a process for the protective, care and hydrophobicizing treatment of hard and soft and closed or porous surfaces, by applying the novel composition to the respective surface. In the novel process, the novel composition is applied by spraying, dipping or using an auxiliary device, such as wadding, textiles, sponges, rollers, cylinders or brushes, and rubbed in. The novel composition has the advantage that it can be applied easily and rubbed in well.

The hard and soft and closed or porous surfaces which are to be treated preferentially are, in particular, metallic surfaces, painted surfaces, plastic surfaces, ceramic glass surfaces, wood surfaces, laminate surfaces, stone, leather, cork or textile surfaces. The composition according to the invention is extremely suitable for the protection, maintenance, and permanently hydrophobicizing treatment of car bodies, cooking areas made of ceramic glass, floorings of all types, wooden articles and wooden furniture, stone, and articles made of leather, cork or textile. As well as the above-described uses, the compositions according to the invention can also be used as antifoams, as agents for textile finishing or in cosmetics as conditioning agents.

An advantage of the compositions according to the invention is that they permit excellent and long-lasting resistance to weathering and washing to be obtained. In order to achieve this effect, it is sufficient to use only small amounts of the compositions according to the invention.

Another advantage of the compositions according to the invention is that the organopolysiloxanes that have amino groups and are solid at room temperature present are stable to hydrolysis since the long-chain alkyl groups and amino groups are bonded to the siloxane via an Si—C bond. However, the compositions according to the invention have the advantage of being inflammable (if on an aqueous basis).

The compositions according to the invention can be applied easily and impart a very high color depth and saturation and also a very high gloss to the surfaces treated therewith.

Unless stated otherwise, all of the data relating to parts and percentages in the Examples described below is by weight. In addition, all of the viscosity data refers to a temperature of 25° C. Unless stated otherwise, the Examples below were carried out at a pressure of the ambient atmosphere, i.e. about 1000 hPa, and at room temperature, i.e. at about 20° C., or at a temperature which results upon adding the reactants together at room temperature without additional heating or cooling.

The contact angle measurements were carried out as follows: a water droplet of volume 0.01 ml is deposited on the surface to be tested from a height of 15 mm, and the contact angle is determined using a goniometer (model 100-10 from Rame-Hart Inc., New Jersey, USA). The measurement is repeated 4 times, and the mean of the 5 measurements calculated. The blank referred to below is the contact angle measurement on the substrate which has not been treated with the composition according to the invention.

I. EXAMPLES FOR THE PREPARATION OF THE NOVEL

ORGANOPOLYSILOXANES THAT HAVE AMINO GROUPS AND ARE SOLID AT ROOM TEMPERATURE

Example I.A

A solution of 92 g (0.250 mol) of octadecylmethyldichlorosilane in 100 ml of petroleum spirit (bp.=80–110° C.) is added dropwise to 200 g of a 12% strength sodium hydroxide solution in water over the course of 2 hours. The mixture is then stirred for 30 minutes at room temperature and then neutralized with 14 ml of concentrated acetic acid. After the aqueous phase has been separated off, the organic phase is dried over 10 g of potassium carbonate, filtered and freed from volatile constituents in a vacuum of 1 mbar with a slow increase in temperature from room temperature to 130° C. This gives a white silicone wax having a melting point of 41.5° C. (Intermediate A)

Example I.B

A mixture of 45 g (0.140 mol of Si-octadecyl) of an OH-terminal polyoctadecylmethylsiloxane (intermediate A), 5 g (0.024 mol) of 3-(2-aminoethylamino) propyldimethoxymethylsilane and 0.20 g of a 20% strength potassium hydroxide solution in water is slowly heated to 110° C. In order to remove the volatile constituents, after 1 hour, a vacuum of 100 mbar is additionally applied, and the mixture is stirred for two hours under these conditions. The mixture is then cooled to 70° C., and 0.30 g of 10% strength acetic acid in toluene are added at atmospheric pressure in order to neutralize the solution. The mixture is then reacted out for 1 hour at a reduced pressure of 1 mbar, and is then filtered at elevated temperature to give a pale yellowish aminofunctional silicone wax having a melting point of 45.5° C. and an amine number of 0.90 mequiv/g.

Example I.C

A mixture of 35.9 g (0.10 mol) of octadecylmethyldimethoxysilane, 4.5 g of water, 0.20 g of a 10% strength hydrochloric acid solution and 12 g of toluene is heated slowly to 80° C. and stirred for 2 hours at this temperature. Then, at elevated temperature, firstly 0.30 g of a 20% strength potassium hydroxide solution in water is added and, finally, 4.2 g (0.02 mol) of 3-(2-aminoethylamino)propyldimethoxymethylsilane are added dropwise over 15 minutes. Distillation is commenced to remove the volatile constituents from the reaction mixture up to a temperature of 120° C. The potassium hydroxide is then deactivated by adding 0.6 g of 10% strength acetic acid in toluene. The reaction mixture is then reacted out at a reduced pressure of about 1 mbar and a temperature of 130° C. for one hour and then filtered. This gives a pale yellowish aminofunctional silicone wax having a melting point of 41.0° C. and an amine number of 1.17 mequiv/g.

Example I.D

A mixture of 31.3 g (0.10 mol of Si-octadecyl) of an OH-terminal polyoctadecylmethylsiloxane (intermediate A), 3.2 g (0.02 mol of Si-3-(2-aminoethylamino)propyl) of an OH-terminal polymethyl-3-(2-aminoethylamino) propylsiloxane, 0.11 g of a 20% strength potassium hydroxide solution in water and 40 g of toluene is heated to boiling with reflux in an apparatus fitted with water separator. After three hours, the toluene is distilled off, and the potassium hydroxide is neutralized by adding 0.03 g of concentrated acetic acid. The reaction solution is then reacted out for one hour at a temperature of 140° C. and a reduced pressure of 1 mbar, and filtered at elevated temperature. This gives a white aminofunctional silicone wax having a melting point of 39.3° C. and an amine number of 1.16 mequiv/g.

Example I.E

A mixture of 45.0 g (0.14 mol of Si-octadecyl) of an OH-terminal polyoctadecylmethylsiloxane (intermediate A), 6.0 g (0.024 mol) of 3-(3-dimethylaminopropylamino) propyldimethoxymethylsilane and 0.20 g of a 20% strength potassium hydroxide solution in water is slowly heated to 110° C. To remove the volatile constituents, after 1 hour, a vacuum of 100 mbar is additionally applied, and the mixture is stirred for two hours under these conditions. The mixture is then cooled to 70° C., and 0.53 g of 10% strength acetic acid in toluene are added at atmospheric pressure in order to neutralize the solution. The mixture is then reacted out for 1 hour at a reduced pressure of 1 mbar, and is then filtered at elevated temperature. This gives a white silicone wax having a melting point of 41.1° C. and an amine number of 0.91 mequiv/g.

Example I.F

A mixture of 45.0 g (0.14 mol of Si-octadecyl) of an OH-terminal polyoctadecylmethylsiloxane (intermediate A), 5.4 g (0.021 mol) of 3-(2-diethylaminoethylamino)propyldimethoxymethylsilane and 0.20 g of a 20% strength potassium hydroxide solution in water is slowly heated to 110° C. To remove the volatile constituents, after 1 hour, a vacuum of 100 mbar is additionally applied, and the mixture is stirred for two hours under these conditions. The mixture is then cooled to 70° C., and 0.53 g of 10% strength acetic acid in toluene are added at atmospheric pressure in order to neutralize the solution. The mixture is then reacted out for 1 hour at a reduced pressure of 1 mbar, and is then filtered at elevated temperature. This gives a white silicone wax having a melting point of 41.2° C. and an amine number of 0.83 mequiv/g.

Example I.G

A mixture of 31.3 g (0.10 mol of Si-octadecyl) of an OH-terminal polyoctadecylmethylsiloxane, 4.0 g (0.02 mol of Si-3-cyclohexylaminopropyl) of an OH-terminal polymethyl-3-cyclohexylaminopropylsiloxane, 0.11 g of a 20% strength potassium hydroxide solution in water and 40 g of toluene is heated to boiling with reflux in an apparatus fitted with water separator. After three hours, the toluene is distilled off, and the potassium hydroxide is neutralized by adding 0.03 g of concentrated acetic acid. The reaction solution is then reacted out for one hour at a temperature of 140° C. and a reduced pressure of 1 mbar, and filtered at elevated temperature. This gives a white aminofunctional silicone wax having a melting point of 39.1° C. and an amine number of 0.57 mequiv/g.

II. FURTHER PREPARATION EXAMPLES AND APPLICATION EXAMPLES AS CARE AGENTS FOR SURFACES

In order to demonstrate the advantages of the organopolysiloxanes that have amino groups and are solid at room temperature, five organopolysiloxanes that are solid at room temperature without and with varying contents of amino groups were prepared, and application tests were carried out thereon. The five organopolysiloxanes are referred to as waxes A–E in the application examples below.

Comparative Example II.A 892.5 g (2.5 mol) of octadecylmethyldimethoxysilane, 180.0 g of water, 321.7 g of toluene and 2.8 g of 18% strength aqueous HCl solution are heated to 90° C. with continuous stirring; at this temperature, the methanol which forms is distilled off for 5 hours, the mixture is cooled to 60° C., 4.2 g of 20% strength aqueous KOH solution are added, the mixture is heated to 140° C. with continuous stirring and simultaneous distillation, maintained at 140° C. for 1 hour and filtered while hot. This gives a white solid silicone wax having a melting point of 48.1° C. (Wax A).

Example II.B 195.6 g (0.63 mol of Si-octadecyl) of wax A from Example II.A and 4.1 g (0.02 mol) of 3-(2-aminoethylamino)propyldimethoxymethylsilane and 0.8 g of 20% strength KOH solution are heated to 110° C. with continuous stirring and maintained at this temperature for 3 hours. After the mixture has been cooled to 60° C., 0.2 g of 99.8% strength acetic acid is added, and the product is distilled out under reduced pressure at 10 mbar up to 140° C. After the mixture has been cooled again to 100° C., the product is filtered. This gives a solid yellowish aminofunctional silicone wax having a melting point of 43.5° C. and an amine number of 0.23 mequiv/g. (Wax B)

Example II.C 186.3 g (0.60 mol of Si-octadecyl) of wax A from Example II.A and 12.4 g (0.06 mol) of 3-(2-aminoethylamino)propyldimethoxymethylsilane and 0.8 g of 20% strength KOH solution are heated to 110° C. with continuous stirring and maintained at this temperature for 3 hours. After the mixture has been cooled to 60° C., 0.2 g of 99.8% strength acetic acid is added, and the product is distilled out under reduced pressure at 10 mbar up to 140° C. After the mixture has been cooled again to 100° C., the product is filtered. This gives a solid yellowish aminofunctional silicone wax having a melting point of 44.5° C. and an amine number of 0.58 mequiv/g. (Wax C)

Example II.D 180.1 g (0.58 mol of Si-octadecyl) of wax A from Example II.A and 20.6 g (0.1 mol) of 3-(2-aminoethylamino)propyldimethoxymethylsilane and 0.8 g of 20% strength KOH solution are heated to 110° C. with continuous stirring and maintained at this temperature for 3 hours. After the mixture has been cooled to 60° C., 0.2 g of 99.8% strength acetic acid is added, and the product is distilled out under reduced pressure at 10 mbar up to 140° C. After the mixture has been cooled again to 100° C., the product is filtered. This gives a solid yellowish aminofunctional silicone wax having a melting point of 47.5° C. and an amine number of 1.04 mequiv/g. (Wax D)

Example II.E 183.2 g (0.59 mol of Si-octadecyl) of wax A from Example II.A and 30.9 g (0.15 mol) of 3-(2-aminoethylamino)propyldimethoxymethylsilane and 0.8 g of 20% strength KOH solution are heated to 110° C. with continuous stirring and maintained at this temperature for 3 hours. After the mixture has been cooled to 60° C., 0.2 g of 99.8% strength acetic acid is added, and the product is distilled out under reduced pressure at 10 mbar up to 140° C. After the mixture has been cooled again to 100° C., the product is filtered. This gives a solid yellowish aminofunctional silicone wax having a melting point of 40.0° C. and an amine number of 1.35 mequiv/g. (Wax E)

Hydrophobicization Testing of Petroleum Spirit-Based Compositions

Waxes A–E are dissolved in petroleum spirit 100/140° (available commercially from Merck) to give a 2% strength solution and applied using wadding to painted sheet metal from a car body having a contact angle of 66° with water and rubbed in. After the sheet metal has been left to stand for 15 minutes at room temperature, the contact angles of the treated surfaces with water are measured, and the substrates are then sprayed 4 times for 15 minutes using in each case 10 1 of water per 100 cm$^2$ of surface at room temperature, using tapwater having a temperature of about 6° C. from a distance of 20 cm. The results of the contact angle measurements following this treatment are given in Table 1.

TABLE 1

| Spraying time [min] | Wax A contact angle [°] | Wax B contact angle [°] | Wax C contact angle [°] | Wax D contact angle [°] | Wax E contact angle [°] |
|---|---|---|---|---|---|
| 0 | 104 | 99 | 98 | 95 | 92 |
| 15 | 97 | 94 | 94 | 94 | 89 |
| 30 | 94 | 94 | 94 | 92 | 89 |
| 45 | 93 | 93 | 93 | 90 | 90 |
| 60 | 91 | 92 | 93 | 91 | 89 |

As regards their time-dependent hydrophobicizing effect, the novel organopolysiloxanes that contain amino groups and are solid at room temperature are substantially the same as or better than organopolysiloxanes without amino groups which are solid at room temperature.

Testing Oleophobicization

Waxes A–E are dissolved in petroleum spirit 100/140° (available commercially from Merck) to give a 2% strength solution and are applied using wadding to painted sheet metal from a car body having a contact angle of 20° with paraffin oil and rubbed in. After the sheet metal has been left to stand for 15 minutes at room temperature, the contact angles of the treated surfaces with paraffin oil are measured. The results are shown in Table 2:

TABLE 2

| Wax A contact angle [°] | Wax B contact angle [°] | Wax C contact angle [°] | Wax D contact angle [°] | Wax E contact angle [°] |
|---|---|---|---|---|
| 35 | 42 | 35 | 37 | 34 |

As regards their time-dependent oleophobicization effect, the novel organopolysiloxanes that contain amino groups and are solid at room temperature are absolutely the same as or better than organopolysiloxanes without amino groups which are solid at room temperature.

Testing Color Saturation

Waxes A–E are dissolved in petroleum spirit 100/140° (available commercially from Merck) to give a 2% strength solution and are applied next to one another using wadding to a black painted sheet metal from a car body and polished. The color saturation is then assessed compared with the untreated sheet metal.

The organopolysiloxane wax A without amino groups and solid at room temperature exhibits only poor color saturation. The color saturation obtained using the novel organopolysiloxanes that contain amino groups and are solid at room temperature is clearly stronger and clearly increases from silicone wax B to silicone wax E.

Aqueous Formulation

Example II.F 25 g of a fatty alcohol polyglycol ether emulsifier (available commercially under the name "Genapol" from Hoechst AG) are added to 175 g of wax A from Example II.A, and the mixture is stirred. This mixture is then emulsified using an emulsifying device by adding 300 g of deionized water with continuous stirring. This gives an aqueous emulsion of organopolysiloxane without amino groups and solid at room temperature, having a solids content of 38 percent by weight, based on the total weight of emulsion.

Example II.G 25 g of a fatty alcohol polyglycol ether emulsifier (available commercially under the name "Genapol" from Hoechst AG) are added to 175 g of wax B from Example II.B, and the mixture is stirred. This mixture is then emulsified using an emulsifying device by adding 300 g of deionized water with continuous stirring. This gives an aqueous emulsion of organopolysiloxane with aminofunctional groups and solid at room temperature having a solids content of 38 percent by weight, based on the total weight of emulsion. .&

Example II.H 15 g of a fatty alcohol polyglycol ether emulsifier (available commercially under the name "Genapol" from Hoechst AG) are added to 175 g of dimethylpolysiloxane terminated with trimethylsiloxy units and having a viscosity of 350 mm$^2$/s (available commercially under the name "Silicone Oil AK 350" from Wacker-Chemie GmbH, Munich), and the mixture is stirred. This mixture is then emulsified using an emulsifying device by adding 310 g of deionized water with continuous stirring. This gives an aqueous emulsion of polydimethylsiloxane liquid at room temperature having a solids content of 38 percent by weight, based on the total weight of emulsion.

Ready-to-use Formulations

Example II.K 0.3 g of polyacrylic acid (available commercially under the name Carbopol from Goodrich, Neuss) are dispersed in 96.4 g of deionized water with stirring, and then 2.0 g of the emulsion described in Example II.F, 1.0 g of the emulsion described in Example II.H, 0.2 g of triethanolamine and 0.1 g of formalin solution (40% strength) are added.

Example II.L 0.3 g of polyacrylic acid (available commercially under the name Carbopol from Goodrich, Neuss) are dispersed in 96.4 g of deionized water with stirring, and then 2.0 g of the emulsion described in Example II.G, 1.0 g of the emulsion described in Example II.H, 0.2 g of triethanolamine and 0.1 g of formalin solution (40% strength) are added.

The resulting hydrophobicizing agents are applied using wadding to the sheet metal of a car body having a contact angle of 66° with water and rubbed in. After the sheet metal has been left to stand for 15 minutes at room temperature, the contact angle with water is measured, and then the sheet is sprayed 4 times for 15 minutes using in each case 10 l of water per 100 cm$^2$ of surface at room temperature, using tapwater having a temperature of about 6° C. from a distance of 20 cm. The results of the contact angle measurements with water are given in Table 3.

TABLE 3

| Spraying time [min] | Formulation II.K Contact angle [°] | Formulation II.L Contact angle [°] |
|---|---|---|
| 0 | 94 | 97 |
| 15 | 92 | 95 |
| 30 | 90 | 94 |
| 45 | 90 | 91 |
| 60 | 88 | 90 |

As regards their time-dependent hydrophobicizing effect, the novel compositions that contain amino groups and are solid at room temperature are superior to organopolysiloxanes without amino groups which are solid at room temperature.

III. APPLICATION EXAMPLE AS GLASS CERAMIC CARE AGENT

In order to demonstrate the advantage of the novel organopolysiloxanes that contain amino groups and are solid at room temperature, a cyclohexylaminopropyl-functional organopolysiloxane that is solid at room temperature (wax F) was prepared, and its protective effect on a glass ceramic plate was compared with that of an aminofunctional organopolysiloxane liquid at room temperature (oil A) and an organopolysiloxane without amino groups that is solid at room temperature (wax A).

Example III.A 118.0 g (0.38 mol of Si-octadecyl) of wax A from Example II.A and 19.5 g (0.075 mol) of cyclohexylaminopropyltrimethoxysilane and 0.5 g of 20% strength KOH solution are heated to 110° C. with continuous stirring and maintained at this temperature for 3 hours. After the mixture has been cooled to 60° C., 0.12 g of 99.8% strength acetic acid are added, and the product is distilled out under reduced pressure at 10 mbar up to 140° C. After the mixture has been cooled again to 100° C., the product is filtered. This gives a solid, yellowish aminofunctional silicone wax having a melting point of 37.5° C. and an amine number of 0.54 mequiv/g. (Wax F)

Example III.B 892.5 g (2.5 mol) of octadecylmethyldimethoxysilane, 180.0 g of water, 321.7 g of toluene are heated together with 2.8 g of 18% strength aqueous HCl solution with continuous stirring to 90° C.; at this temperature, the methanol which forms is distilled off over 5 hours, the mixture is cooled to 60° C., 4.2 g of 20% strength aqueous KOH solution are added, the mixture is heated to 140° C. with continuous stirring and simultaneous distillation, maintained at 140° C. for 1 hour and filtered while hot. This gives a white solid silicone wax having a melting point of 48.1° C. (Wax A).

Example III.C 180.0 g (2.43 mol of $SiMe_2O$) of α,ω-dihydroxypolydimethylsiloxane having a viscosity of 60 $mm^2$/s and 9.5 g (0.04 mol) of cyclohexylaminopropyltrimethoxysilane and 0.72 g of 20% strength KOH solution are heated to 105° C. with continuous stirring and maintained at this temperature for 2 hours. After the mixture has been cooled to 70° C., 0.19 g of 99.8% strength acetic acid is added, and the product is distilled out under reduced pressure at 10 mbar to 140° C. After the mixture has been cooled again to 100° C., the product is filtered. This gives a clear yellowish aminofunctional silicone oil having a viscosity of 95 mm2/s and an amine number of 0.2 mequiv/g. (Oil A)

Example III.D

A cleaner and care agent for glass ceramic surfaces using the organopolysiloxane that is solid at room temperature and described in Example III.A is prepared in the form of an oil-in-water emulsion having the following composition:

| | |
|---|---|
| Aminofunctional organopolysiloxane (Wax F) | 20% by weight |
| Linear dimethylpolysiloxane having a viscosity of 350 $mm^2$/s at 25° C. | 2% by weight |
| Liquid hydrocarbon free from aromatic compounds and having a boiling range 180–210° C. | 26% by weight |
| Nonionogenic emulsifier (e.g. fatty alcohol polyglycol ether having about 10 ethylene oxide units) | 10% by weight |
| Citric acid | 1% by weight |
| Alumina of particle size 1–100 μm | 10% by weight |
| Water | 31% by weight |

The two organopolysiloxanes were mixed with the liquid hydrocarbon that is free from aromatic compounds, and the emulsifiers to give an oil phase, and then the water was slowly added with continuous stirring. Finally, the citric acid and the alumina were dispersed in to give a storage-stable, high-viscosity oil-in-water emulsion.

Example III.E

A cleaner and care agent for glass ceramic surfaces is prepared using the same composition as described in Example III.D except that the wax A prepared in Example III.B was used instead of wax F.

Example III.F

A cleaner and care agent for glass ceramic surfaces is prepared using the same composition as described in Example III.D except that the oil A prepared in Example III.C was used instead of wax F.

Example III.G

To comparatively assess cleaning and care action of the foregoing compositions, approximately 1 g of the care agent was applied to and evenly distributed on a slightly soiled decorative glass ceramic plate measuring 25 cm×25 cm. The plate was then polished using a damp household cloth until the surface appeared to be free of streaks. At this point, the cleaning action and the substantivity of the protective film to the touch were assessed.

Then, in order to test the protective effect, the surface was covered with an approximately 3 mm high layer of sugar and heated until the sugar had completely caramelized or carbonized. After the surface had cooled, the adherence of the caramelized sugar, the ease and extent of detachment from the surface and also the surface condition with regard to damage (delamination) were assessed.

The results are given in Table 4:

TABLE 4

| Example | III.D | III.E | III.F |
|---|---|---|---|
| Substantivity | good | good | average |
| Polishability | very good | good | good |
| Cleaning action | good | good | good |
| Protective effect (separation effect and surface condition) | very good | poor | good |

What is claimed is:
1. An organopolysiloxane bearing amino groups which is solid at room temperature, and which can reversibly change its state of aggregation on the basis of temperature changes, comprising linear or cyclic organopolysiloxanes or their mixtures of the formulae II

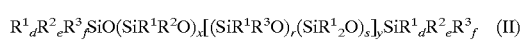  (II)

or III

  (III)

in which $R^1$ can each be identical or different and is a monovalent unsubstituted or substituted hydrocarbon radical, alkoxy radical, hydroxy radical or halogen radical, $R^2$ can each be identical or different and is a monovalent unsubstituted hydrocarbon radical different from $R^1$, $R^3$ can each be identical or different and is a hydrocarbon radical containing one or more amino groups, $R^4$ can be identical or different and signifies $R^1$, $R^2$ or $R^3$, d is 1,2 or 3, e is 0, 1 or 2, f is 0, 1 or 2, r is an integer from 0 to 150, s is an integer from 0 to 200, x is an integer from 0 to 300, y is an integer from 0 to 200, and the sum x+y is from 0 to 500, it being possible for the units $(SiR^1R^3O)_r$ and $(SiR^1{}_2O)_s$ to be in any order, z is an integer from 3 to 30, with the proviso that at least one radical $R^2$ in formula II signifies a hydrocarbon radical having at least 14 carbon atoms, and at least one radical $R^3$ is present in formula II, and with the proviso that at least the radical $R^4$ in formula III has at the same time the meaning of $R^2$ once and the meaning of $R^3$ once.

2. The organopolysiloxane bearing amino groups of claim 1, wherein each $R^1$ individually is selected from the group consisting of $C_{1-12}$ hydrocarbon, $C_{1-12}$ alkoxy, halogen, and hydroxy, $R^2$ is a $C_{14}$–$C_{40}$ hydrocarbon radical, r is 0–50, s is 0–100, x is 0–100, y is 0–100, the sum of x+y is 0–200, and z is 3–12.

3. The organopolysiloxane bearing amino groups of claim 1, wherein $R^3$ is

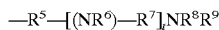

wherein $R^5$ is a divalent $C_1$- to $C_{18}$-hydrocarbon radical, $R^6$ is a hydrogen atom or an unsubstituted or fluorine-, chlorine- or bromine-substituted $C_1$- to $C_{10}$-alkyl radical, $R^7$ is a divalent $C_1$- to $C_{18}$-hydrocarbon radical, $R^8$ is a hydrogen atom or an unsubstituted or fluorine-, chlorine- or bromine-substituted $C_1$- to $C_{10}$-alkyl radical, $R^9$ is a hydrogen atom or an unsubstituted or fluorine-, chlorine- or bromine-substituted $C_1$- to $C_{10}$-alkyl radical, and t is an integer from 0 to 6.

4. The organopolysiloxane bearing amino groups of claim 2, wherein $R^3$ is

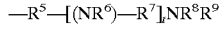

wherein $R^5$ is a divalent $C_1$- to $C_{18}$-hydrocarbon radical, $R^6$ is a hydrogen atom or an unsubstituted or fluorine-, chlorine- or bromine-substituted $C_1$- to $C_{10}$-alkyl radical, $R^7$ is a divalent $C_1$- to $C_{18}$-hydrocarbon radical, $R^8$ is a hydrogen atom or an unsubstituted or fluorine-, chlorine- or bromine-substituted $C_1$- to $C_{10}$-alkyl radical, $R^9$ is a hydrogen atom or an unsubstituted or fluorine-, chlorine- or bromine-substituted $C_1$- to $C_{10}$-alkyl radical, and t is an integer from 0 to 6.

5. A process for the preparation of an organopolysiloxane that has amino groups and is solid at room temperature as claimed in claim 1, which comprises reacting silanes of the general formula VI $$R^1{}_g R^2{}_h Si \qquad\qquad (VI)$$

or oligomeric hydrolysates of the silanes of the formula VI or any mixtures thereof together with organosilicon compounds chosen from silanes of the general formula VII $$R^1{}_i R^3{}_k Si \qquad\qquad (VII)$$

or siloxanes constructed from siloxane units of the general formula VIII $$R^1{}_l R^3{}_m SiO_{(4-l-m)/2} \qquad\qquad (VIII)$$

or any mixtures thereof, in which $R^1$, $R^2$ and $R^3$ are as defined above, g is 1, 2 or 3, h is 0, 1 or 2, i is 1, 2 or 3, k is 0, 1 or 2, l is 0, 1, 2 or 3, and m is 0, 1 or 2; g+h=i+k=4.

6. A process for the preparation of an organopolysiloxane that has amino groups and is solid at room temperature as claimed in claim 2, which comprises reacting silanes of the general formula VI $$R^1{}_g R^2{}_h Si \qquad\qquad (VI)$$

or oligomeric hydrolysates of the silanes of the formula VI or any mixtures thereof together with organosilicon compounds chosen from silanes of the general formula VII $$R^1{}_i R^3{}_k Si \qquad\qquad (VII)$$

or siloxanes constructed from siloxane units of the general formula VIII $$R^1{}_l R^3{}_m SiO_{(4-l-m)/2} \qquad\qquad (VIII)$$

or any mixtures thereof, in which $R^1$, $R^2$ and $R^3$ are as defined above, g is 1, 2 or 3, h is 0, 1 or 2, i is 1, 2 or 3, k is 0, 1 or 2, l is 0, 1, 2 or 3, and m is 0, 1 or 2, g+h=i+k=4.

7. A process for the preparation of an organopolysiloxane that has amino groups and is solid at room temperature as claimed in claim 3, which comprises addition of SiH group-containing organopolysiloxanes

or silanes to aminofunctional alkenes of the general formula IX

in the presence of a catalyst which promotes hydrosilylation, in which $R^1$ and $R^2$ are as defined above, and $R^5$ is a divalent $C_1$- to $C_{18}$-hydrocarbon radical, $R^6$ is a hydrogen atom or an unsubstituted or fluorine-, chlorine- or bromine-substituted $C_1$- to $C_{10}$-alkyl radical, $R^7$ is a divalent $C_1$- to $C_{18}$-hydrocarbon radical, $R^8$ is a hydrogen atom or an unsubstituted or fluorine-, chlorine- or bromine-substituted $C_1$- to $C_{10}$-alkyl radical, $R^9$ is a hydrogen atom or an unsubstituted or fluorine-, chlorine- or bromine-substituted $C_1$- to $C_{10}$-alkyl radical, $R^{15}$ is a hydrogen atom or a radical $R^1$ and t is an integer from 0 to 6.

8. A solution or emulsion suitable for use as a care agent for surfaces, comprising from 0.01 to 10.0 percent by weight, based on the total weight of the solution or emulsion of one or more organopolysiloxanes that have amino groups and are solid at room temperature and can reversibly change their state of aggregation on the basis of temperature changes.

9. A solution or emulsion suitable for use as a care agent for surfaces, comprising from 0.01 to 10.0 percent by weight, based on the total weight of the solution or emulsion of one or more organopolysiloxanes that have amino groups and are solid at room temperature and can reversibly change their state of aggregation on the basis of temperature changes, wherein said organopolysiloxanes comprise siloxane units of the general formula I

in which $R^1$ can each be identical or different and is a monovalent unsubstituted or substituted hydrocarbon radical, alkoxy radical, hydroxy radical or halogen radical, $R^2$ can each be identical or different and is a monovalent unsubstituted hydrocarbon radical different from $R^1$, $R^3$ can each be identical or different and is a hydrocarbon radical containing one or more amino groups, a is 0, 1, 2 or 3, b is 0, 1 or 2, c is 0, 1 or 2, with the proviso that the sum a+b+c is less than or equal to 3, and the organopolysiloxane contains at least one $R^3$.

10. A solution or emulsion suitable for use as a care agent for surfaces, comprising from 0.01 to 10.0 percent by weight, based on the total weight of the solution or emulsion of one or more organopolysiloxanes that have amino groups and are solid at room temperature as claimed in claim 1.

11. A solution or emulsion suitable for use as a care agent for surfaces, comprising from 0.01 to 10.0 percent by weight, based on the total weight of the solution or emulsion of one or more organopolysiloxanes that have amino groups and are solid at room temperature as claimed in claim 2.

12. A solution or emulsion suitable for use as a care agent for surfaces, comprising from 0.01 to 10.0 percent by weight, based on the total weight of the solution or emulsion of one or more organopolysiloxanes that have amino groups and are solid at room temperature as claimed in claim 3.

13. A solution or emulsion suitable for use as a care agent for surfaces, comprising from 0.01 to 10.0 percent by weight, based on the total weight of the solution or emulsion of one or more organopolysiloxanes that have amino groups and are solid at room temperature as claimed in claim 4.

14. A solution or emulsion suitable for use as a care agent for surfaces, comprising from 0.01 to 10.0 percent by weight, based on the total weight of the solution or emulsion of one or more organopolysiloxanes that have amino groups and are solid at room temperature prepared by the process of claim 5.

15. A solution or emulsion suitable for use as a care agent for surfaces, comprising from 0.01 to 10.0 percent by weight, based on the total weight of the solution or emulsion of one or more organopolysiloxanes that have amino groups and are solid at room temperature prepared by the process of claim 7.

16. A process for treating surfaces which comprises applying to said surface the solution or emulsion of claim 8.

17. A process for treating surfaces which comprises applying to said surface the solution or emulsion of claim 9.

18. A process for treating surfaces which comprises applying to said surface the solution or emulsion of claim 10.

19. A process for treating surfaces which comprises applying to said surface the solution or emulsion of claim 14.

20. The process of claim 16, wherein said surface is a glass ceramic surface.

21. The organopolysiloxane of claim 1, wherein at least one $R^2$ contains from 15–40 carbon atoms.

22. The organopolysiloxane of claim 2, wherein at least one $R^2$ contains from 15–40 carbon atoms.

23. The organopolysiloxane of claim 3, wherein at least one $R^2$ contains from 15–40 carbon atoms.

24. The organopolysiloxane of claim 4, wherein at least one $R^2$ contains from 15–40 carbon atoms.

* * * * *